(12) United States Patent
Adam (10) Patent No.: US 11,763,613 B2
(45) Date of Patent: Sep. 19, 2023

(54) AUTOMATIC CREATION AND MANAGEMENT OF DIGITAL IDENTITY PROFILES FOR ACCESS CONTROL

(71) Applicant: Johnson Controls Tyco IP Holdings LLP, Milwaukee, WI (US)

(72) Inventor: Lipphei Adam, Nolensville, TN (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 105 days.

(21) Appl. No.: 17/195,219

(22) Filed: Mar. 8, 2021

(65) Prior Publication Data

US 2022/0284749 A1  Sep. 8, 2022

(51) Int. Cl.
| | | |
|---|---|---|
| G07C 9/00 | (2020.01) | |
| G06N 20/00 | (2019.01) | |
| G06V 40/16 | (2022.01) | |
| H04L 9/40 | (2022.01) | |

(52) U.S. Cl.
CPC ......... G07C 9/00563 (2013.01); G06N 20/00 (2019.01); G06V 40/172 (2022.01); H04L 63/102 (2013.01); H04L 63/107 (2013.01)

(58) Field of Classification Search
CPC .. G07C 9/00563; G06N 20/00; G06V 40/172; H04L 63/102; H04L 63/107
USPC ...................................................... 340/5.83
See application file for complete search history.

(56) References Cited

U.S. PATENT DOCUMENTS

| | | | | |
|---|---|---|---|---|
| 9,003,196 B2* | 4/2015 | Hoyos | ................ | G06Q 20/3223 713/186 |
| 9,454,656 B2* | 9/2016 | Oberheide | .............. | G06F 21/45 |
| 9,721,147 B1* | 8/2017 | Kapczynski | ......... | G06Q 50/265 |
| 10,235,822 B2* | 3/2019 | Nye | ....................... | G05B 15/02 |
| 10,274,909 B2* | 4/2019 | Lyman | ................ | H04L 12/2803 |
| 10,659,495 B1* | 5/2020 | Roche | .................... | H04L 63/102 |
| 10,850,709 B1* | 12/2020 | Nagata | ............... | G07C 9/00563 |
| 10,958,641 B2* | 3/2021 | Burmester | ............ | H04L 63/105 |
| 10,977,356 B2* | 4/2021 | Hochrieser | ............. | G06F 21/32 |
| 11,042,719 B2* | 6/2021 | Rodriguez | ............ | H04L 9/3213 |
| 11,157,606 B2* | 10/2021 | Tussy | ..................... | G06V 40/20 |
| 11,170,593 B1* | 11/2021 | Schneider | .......... | G07C 9/00571 |

(Continued)

FOREIGN PATENT DOCUMENTS

WO 2020014311 A1 1/2020

OTHER PUBLICATIONS

International Search Report and Written Opinion in PCT/US2022/070973, dated Jun. 20, 2022, 14 pages.

*Primary Examiner* — Nam V Nguyen
(74) *Attorney, Agent, or Firm* — ARENTFOX SCHIFF LLP (57) ABSTRACT

Example aspects include a method, apparatus, and computer-readable medium comprising identifying, by an access control system, an access attempt associated with an individual. The aspects further include confirming, by the access control system, an identity of the individual. Additionally, the aspects further include granting access to the individual by the access control system in response to confirming the identity of the individual. Additionally, the aspects further include building, by the access control system, a digital identity profile of the individual based on visual data of the individual captured contemporaneously with the access attempt.

20 Claims, 6 Drawing Sheets

(56) References Cited

U.S. PATENT DOCUMENTS

| | | | |
|---|---|---|---|
| 2003/0217294 A1* | 11/2003 | Kyle | G07C 9/38 |
| | | | 713/186 |
| 2004/0046641 A1 | 3/2004 | Junqua et al. | |
| 2014/0270349 A1* | 9/2014 | Amtrup | G06V 30/142 |
| | | | 382/103 |
| 2019/0095702 A1* | 3/2019 | Chan | H04L 63/0861 |
| 2019/0147676 A1 | 5/2019 | Madzhunkov et al. | |
| 2019/0272361 A1* | 9/2019 | Kursun | H04L 67/535 |
| 2020/0334344 A1* | 10/2020 | Schwartz | H04L 63/0861 |
| 2020/0394238 A1* | 12/2020 | Ellrod | G06F 16/9535 |
| 2021/0358252 A1* | 11/2021 | Sabripour | G06V 40/165 |
| 2022/0264668 A1* | 8/2022 | Lumbatis | H04W 76/38 |
| 2022/0300962 A1* | 9/2022 | Zia | G06Q 20/326 |

\* cited by examiner

AUTOMATIC CREATION AND MANAGEMENT OF DIGITAL IDENTITY PROFILES FOR ACCESS CONTROL

FIELD

The present disclosure relates generally to access control systems and methods.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of access control comprising identifying, by an access control system, an access attempt associated with an individual. The method further includes confirming, by the access control system, an identity of the individual. Additionally, the method further includes granting access to the individual by the access control system in response to confirming the identity of the individual. Additionally, the method further includes building, by the access control system, a digital identity profile of the individual based on visual data of the individual captured contemporaneously with the access attempt.

Another example aspect includes an apparatus for access control comprising a memory and a processor communicatively coupled with the memory. The processor is configured to identify, by an access control system, an access attempt associated with an individual. The processor is further configured to confirm, by the access control system, an identity of the individual. Additionally, the processor further configured to grant access to the individual by the access control system in response to confirming the identity of the individual. Additionally, the processor further configured to build, by the access control system, a digital identity profile of the individual based on visual data of the individual captured contemporaneously with the access attempt.

Another example aspect includes an apparatus for access control comprising means for identifying an access attempt associated with an individual. The apparatus further includes means for confirming an identity of the individual. Additionally, the apparatus further includes means for granting access to the individual in response to confirming the identity of the individual. Additionally, the apparatus further includes means for building a digital identity profile of the individual based on visual data of the individual captured contemporaneously with the access attempt.

Another example aspect includes a computer-readable medium storing instructions for access control executable to identify, by an access control system, an access attempt associated with an individual. The instructions are further executable to confirm, by the access control system, an identity of the individual. Additionally, the instructions are further executable to grant access to the individual by the access control system in response to confirming the identity of the individual. Additionally, the instructions are further executable to build, by the access control system, a digital identity profile of the individual based on visual data of the individual captured contemporaneously with the access attempt.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide methods and systems for automatic creation and management of digital identity profiles for access control. Some aspects include an access control system that operates in conjunction with a camera installed nearby and pointing at a location of the entrance of a premises to automate the process of creating and managing digital identity profiles used to provide frictionless access.

Turning now to the figures, example aspects are depicted with reference to one or more components described herein, where components in dashed lines may be optional.

Figure 1:
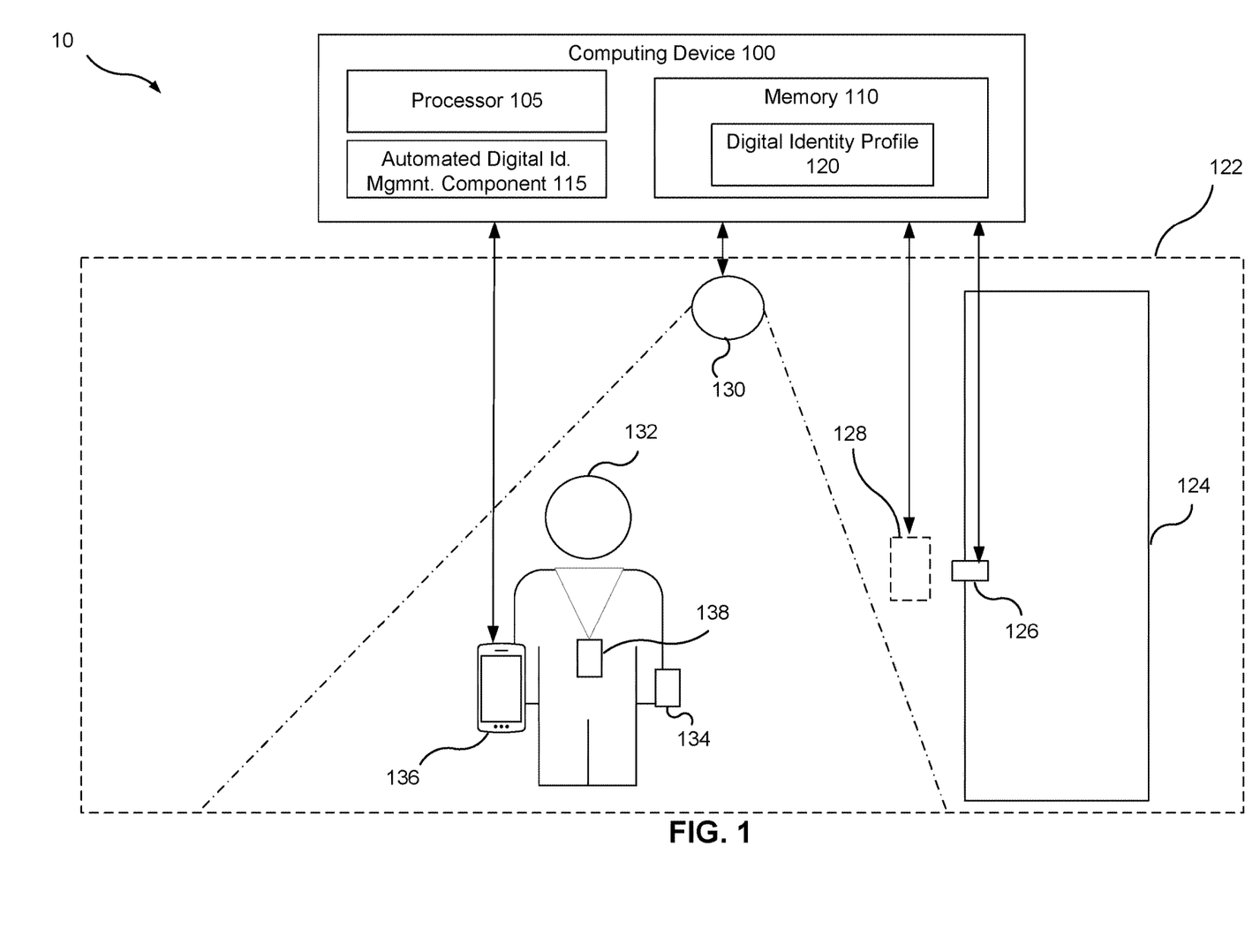
FIG. 1 is a schematic diagram of an example access control system configured for automatically creating digital identity profiles, according to some aspects.

Referring to FIG. 1, in one non-limiting aspect, an access control system 10 may be configured to control a lock 126 on an entrance 124 of a premises 122 in order to control access through the entrance 124 of the premises 122. In one non-limiting aspect, for example, the access control system 10 may be configured to grant access to an individual 132 pursuant to positively identifying the individual 132 based on reading information from a badge 138 or a key fob 134 via an access panel 128 positioned next to the entrance 124 and/or based on biometric data, voice, image, passcode, or other identifying information received via the access panel 128 or via a mobile device 136 of the individual 132.

In some alternative and/or additional aspects, the access control system 10 may be configured to provide "frictionless" access, e.g., the access control system 10 may not require a physical user interaction for entering user credentials and/or identifying information. For example, the access control system 10 may be configured to grant access to the individual 132 based on identifying the individual 132 in images and/or video captured by a camera 130 at the location of the entrance 124.

In some aspects, the access control system 10 may be configured to provide frictionless access via upfront registration/enrollment or by referencing a database to determine the identity of the individual 132 before granting access. For example, in order to be able to recognize the face of the individual 132, the access control system 10 may have the individual 132 register/enroll with the access control system 10 by uploading their facial pictures. Alternatively, in order to be able to recognize the face of the individual 132, the access control system 10 may have access to a database that includes facial pictures of the individual 132.

In some present aspects, however, the access control system 10 may operate in conjunction with one or more image/video capture devices, such as a camera 130 installed nearby and pointing at a location of the entrance 124, to automate the process of creating and managing digital identity profiles 120 used to provide frictionless access.

For example, in an aspect, when the access control system 10 grants access to the individual 132 pursuant to positively identifying the individual 132 based on reading the badge 138 or the key fob 134 via the access panel 128 next to the entrance 124 and/or based on biometric data, voice, image, passcode, or other identifying information received via the access panel 128 or via the mobile device 136, the access control system 10 may control the camera 130 to capture snapshots of the location of the granted access, including, for example, images and/or videos that include the individual 132 at the location where/when access was granted. Then, the access control system 10 may correlate the data in the captured snapshots to the identified individual 132 to build a digital identity profile 120 for the identified individual 132.

In an aspect, for example, the access control system 10 may receive the images/videos captured by the camera 130, and provide the images/videos as input into artificial intelligence (AI)/machine learning (ML) models that are configured for extracting the data including various characteristics/features of the individual 132 from the images/videos. For example, such AI/ML models may be configured to identify visual characteristics of the individual 132 such as face, height, build, age, gender, hair color, clothing, etc., which may also vary over time. The access control system 10 may then receive the extracted features from the AI/ML models and then populate one or more corresponding profile fields in the digital identity profile 120 of the individual 132. Accordingly, in an aspect, the digital identity profile 120 may include historical and/or current visual characteristics of the individual 132 such as face, height, build, age, gender, hair color, clothing, etc. In addition to the visual characteristics of the individual 132, the digital identity profile 120 may also include data associated with the access requests including the corresponding place and time of access requests of the individual 132. For example, in an aspect, the individual 132 may arrive at work and/or leave work at around the same time each day, etc., and the time and place of arriving at work and/or leaving work may be stored in the digital identity profile 120 of the individual 132 along with visual characteristics of the individual 132. Such historical and current data of the corresponding place and time of access requests of the individual 132 may be utilized by the AI/ML models to further evaluate the identity of the individual 132 and/or supplement a confidence level in a predication of the identity of the individual 132.

Figure 2:
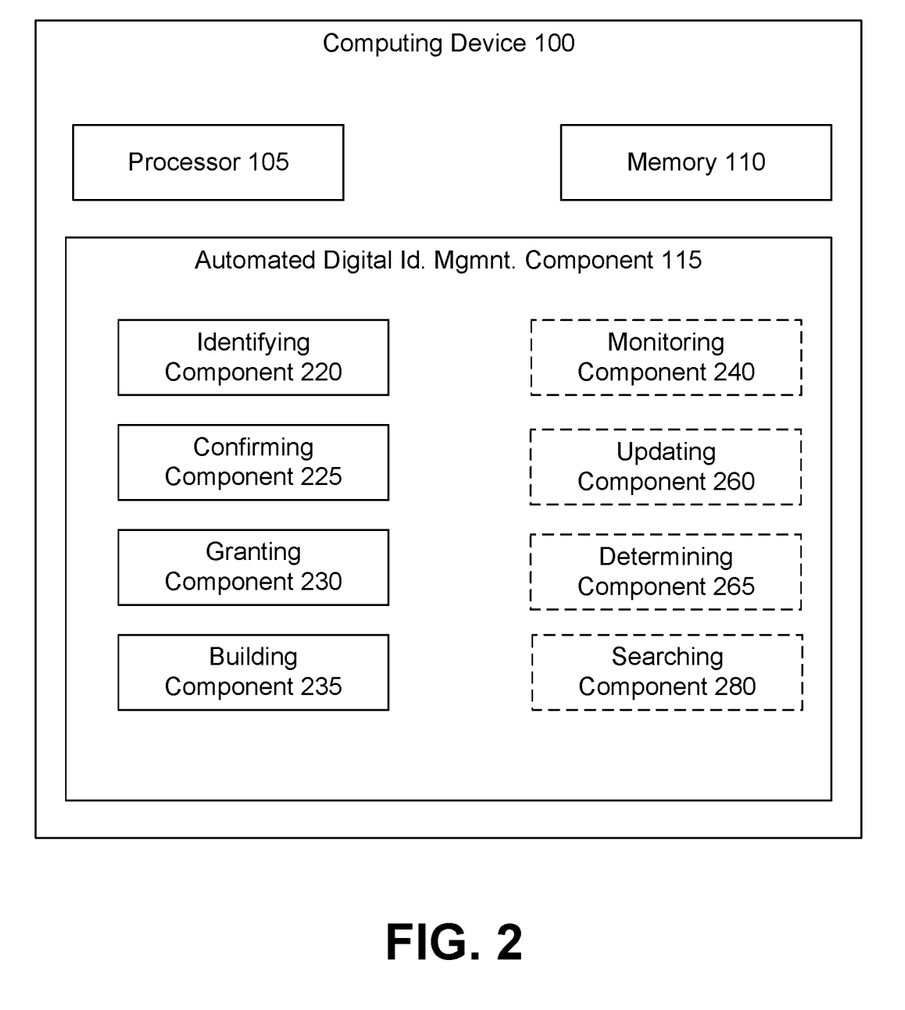
FIG. 2 is a block diagram of example components of the computing device in FIG. 1, according to some aspects.

In an aspect, for example, referring now to both FIGS. 1 and 2, the access control system 10 may include a computing device 100 that includes a processor 105, a memory 110, and an automated digital identity profile management component 115. The processor 105 may be configured to execute one or more components within the automated digital identity profile management component 115 to automatically create and manage the digital identity profile 120, which is stored in the memory 110, based on the data received during one or more access requests made by the individual 132. Further details of various components within the automated digital identity profile management component 115 are described below with reference to FIGS. 1-5.

In some aspects, the digital identity profile 120 may be used by the access control system 10 to improve the security and/or reliability of the access control system 10. For example, no access may be granted to a rogue person that is stealing and using the badge 138 of the individual 132 if one or more of the face, height, build, age, gender, access request location, and/or access request time of the rogue person does not match the corresponding information stored in the digital identity profile 120 associated with the badge 138 of the individual 132.

Alternatively and/or additionally, the access control system 10 may use the digital identity profile 120 for granting automatic frictionless access to the individual 132 (e.g., without requiring manual registration) once the digital identity profile 120 has reached a sufficiently high confidence level. In one non-limiting aspect, for example, the confidence level is a statistical measure of the accuracy of estimating the identity of the individual 132 by an AI/ML model that correlates the digital identity profile 120 with features extracted from images/videos captured at the entrance 124.

In one aspect, for example, the AI/ML models define a multi-dimensional space based on the number of features that are extracted from each image/video, and build the digital identity profile 120 as a cluster of points in the multi-dimensional space, where each point in the cluster in the multi-dimensional space represents the features extracted from an image captured contemporaneously with an access attempt by the individual 132.

In an aspect, when the digital identity profile 120 has a sufficiently high confidence level (e.g., 95%), the access control system 10 may continuously monitor the entrance 124 of the premises 122, and may automatically grant access through the entrance 124 when a person identified in images/videos captured by the camera 130 at the entrance 124 matches the digital identity profile 120 of the individual 132.

In an aspect, for example, when a new image is captured by the camera 130 at the entrance 124, the AI/ML models extract various features from the new image, find a new point in the multi-dimensional space that represents the features extracted from the new image, and determine the distance in the multi-dimensional space between the cluster representing the digital identity profile 120 of the individual 132 and the new point representing the features extracted from the new image. In this case, the confidence in identifying the individual 132 by the AI/ML models based on the new image and the digital identity profile 120 is inversely proportional to the distance in the multi-dimensional space between the cluster representing the digital identity profile 120 and the new point representing the features extracted from the new image. That is, the closer the new point is to the cluster in the multi-dimensional space, the more confidence there is in identifying the individual 132 based on the new image and the digital identity profile 120.

In some aspects, if the access control systems 10 is unable to determine with a sufficient confidence level that a person in images/videos captured by the camera 130 at the entrance 124 matches the digital identity profile 120 of the individual 132, the access control system 10 may require another method of identification/authentication to grant access to the individual 132. For example, if the images/videos captured by the camera 130 at the entrance 124 are unclear (e.g., due to bad weather, poor lighting, dirty camera lens, etc.) and/or if the appearance of the individual 132 has changed (e.g., different cloths, haircut, hair color, etc.), the access control system 10 may be unable to determine with sufficient certainty that a person identified in images/videos captured by the camera 130 at the entrance 124 matches the digital identity profile 120 of the individual 132, and may thus not provide frictionless access to the individual 132. In this case, the individual 132 may have to attempt access by swiping the badge 138 or the key fob 134 at the access panel 128 assembled next to the entrance 124 and/or by providing biometric data, voice, image, passcode, or other identifying information via the access panel 128 or via the mobile device 136.

Unlike systems that use static profiles created based on a static manual registration upfront, the access control system 10 operating the automatic digital identity management component 115 according to the present aspects may include a continuous feedback loop that continually and automatically improves/adapts the digital identity profile 120 over time, using the AI/ML models. Additionally, the digital identity profile 120 according to the present aspects may be used for other analytics such as searching in recorded footage for the individual 132 by their identity or name.

In one non-limiting aspect, for example, in addition to or instead of analytics to search by facial recognition or by attributes (e.g., gender, age, build, height, hair color, etc.) over footage where face is clearly identifiable, the present aspects may allow for running queries on all footage based on a person's name, employment identifier number, etc. For example, in an aspect, a user may run a query such as "show me all the videos with 'John Smith' in the last 24 hours."

Accordingly, the present aspects may be more efficient than systems that require manual upfront registration for frictionless access control with person identification. The present aspects also automatically manage/update digital identity profiles which may change over time (e.g., a person's appearance may change over time).

Figure 3:
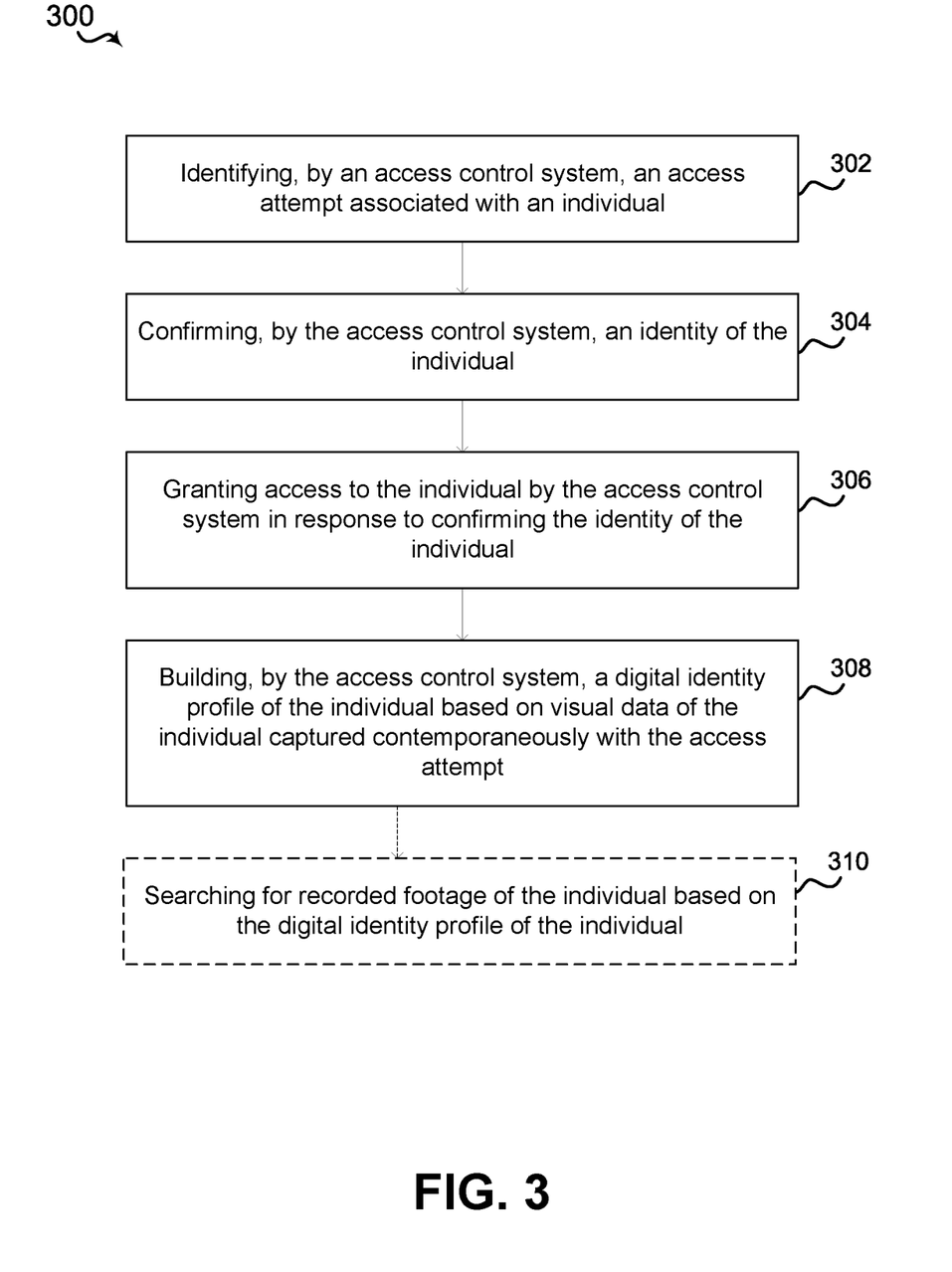
FIG. 3 is a flow diagram of a first example method for automatically creating digital identity profiles, according to some aspects.

Referring to FIGS. 2 and 3, in operation, computing device 100 may perform a method 300 of access control, by such as via execution of automated digital identity profile management component 115 by processor 105 and/or memory 110.

At block 302, the method 300 includes identifying, by an access control system, an access attempt associated with an individual. For example, in an aspect, computing device 100, processor 105, memory 110, automated digital identity profile management component 115, and/or identifying component 220 may be configured to or may comprise means for identifying, by an access control system 10, an access attempt associated with an individual 132.

For example, the identifying at block 302 may include reading the badge 138 or the key fob 134 via the access panel 128 assembled next to the entrance 124 and/or based on biometric data, voice, image, passcode, or other identifying information received via the access panel 128 or via the mobile device 136 of the individual 132.

At block 304, the method 300 includes confirming, by the access control system, an identity of the individual. For example, in an aspect, computing device 100, processor 105, memory 110, automated digital identity profile management component 115, and/or confirming component 225 may be configured to or may comprise means for confirming, by the access control system 10, an identity of the individual 132.

For example, the confirming at block 304 may include positively identifying the individual 132 based on reading the badge 138 or the key fob 134 via the access panel 128 assembled next to the entrance 124 and/or based on biometric data, voice, image, passcode, or other identifying information received via the access panel 128 or via the mobile device 136 of the individual 132.

At block 306, the method 300 includes granting access to the individual by the access control system in response to confirming the identity of the individual. For example, in an aspect, computing device 100, processor 105, memory 110, automated digital identity profile management component 115, and/or granting component 230 may be configured to or may comprise means for granting access to the individual 132 by the access control system 10 in response to confirming the identity of the individual 132.

For example, the granting at block 306 may include the access control system 10 sending a control signal for unlocking the lock 126 on the entrance 124 of the premises 122 in order to grant access to the individual 132 through the entrance 124 of the premises 122.

At block 308, the method 300 includes building, by the access control system, a digital identity profile of the individual based on visual data of the individual captured contemporaneously with the access attempt. For example, in an aspect, computing device 100, processor 105, memory 110, automated digital identity profile management component 115, and/or building component 235 may be configured to or may comprise means for building, by the access control system 10, a digital identity profile 120 of the individual 132 based on visual data of the individual 132 captured by the camera 130 contemporaneously with the access attempt of the individual 132.

For example, the building at block 308 may include the access control system 10 correlating the data identified in and/or derived from the images/video captured by the camera 130 to the identified individual 132 and adding such data to build the digital identity profile 120 for the identified individual 132.

Optionally, in an aspect, the digital identity profile 120 of the individual 132 comprises visual characteristics of the individual 132.

Optionally, in an aspect, the digital identity profile 120 of the individual 132 further comprises at least one of location information or time information of the access attempt of the individual 132.

Optionally, in an aspect, building the digital identity profile 120 of the individual 132 comprises using a machine learning model to extract the visual characteristics of the individual 132 from the visual data.

In an optional aspect, at block 310, the method 300 may further include searching for recorded footage of the individual based on the digital identity profile of the individual. For example, in an aspect, computing device 100, processor

105, memory 110, automated digital identity profile management component 115, and/or searching component 280 may be configured to or may comprise means for searching for recorded footage of the individual 132 based on the digital identity profile 120 of the individual 132.

Further, for example, the searching at block 310 may be performed in addition to or instead of analytics to search by facial recognition or by attributes (e.g., gender, age, build, height, hair color, etc.) over footage where face is clearly identifiable. In one non-limiting aspect, for example, queries may be run on all footage based on a person's name, employment identifier number, etc. For example, in an aspect, a user may run a query such as "show me all the videos with 'John Smith' in the last 24 hours."

Figure 4:
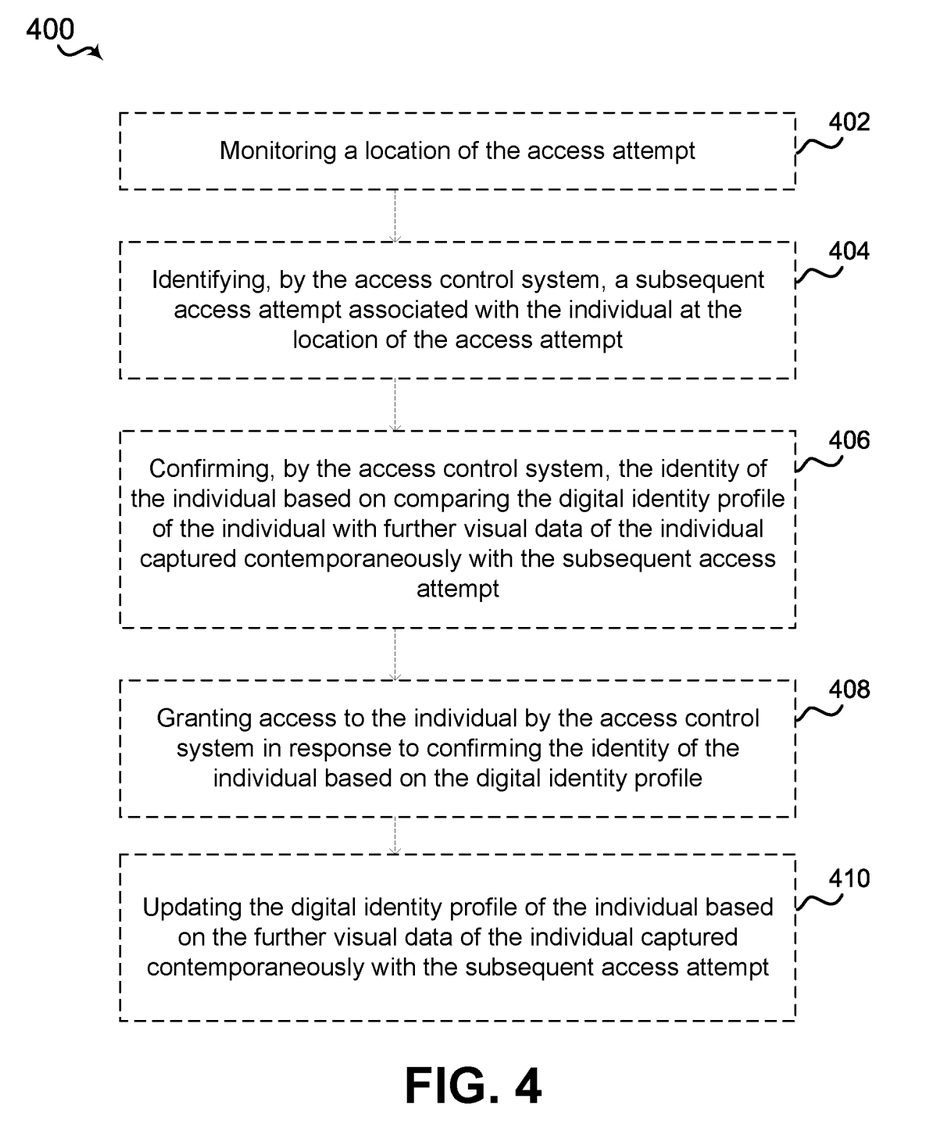
FIG. 4 is a flow diagram of a second example method for automatically creating digital identity profiles, according to some aspects.

Referring to FIG. 4, in an optional aspect, at block 402, the method 400 may further include monitoring a location of the access attempt. For example, in an aspect, computing device 100, processor 105, memory 110, automated digital identity profile management component 115, and/or monitoring component 240 may be configured to or may comprise means for monitoring a location of the access attempt.

Optionally, in an aspect, monitoring the location of the access attempt comprises visually monitoring the location of the access attempt by the camera 130. For example, the monitoring at block 402 may include using/controlling the camera 130 to monitor an area where the individual 132 attempted access through the entrance 124 of the premises 122.

Optionally or additionally, in an aspect, monitoring the location of the access attempt comprises tracking motion at the location of the access attempt (e.g., by a motion tracking device configured to track motion at the entrance 124).

In this optional aspect, at block 404, the method 400 may further include identifying, by the access control system, a subsequent access attempt associated with the individual at the location of the access attempt. For example, in an aspect, computing device 100, processor 105, memory 110, automated digital identity profile management component 115, and/or identifying component 220 may be configured to or may comprise means for identifying, by the access control system 10, a subsequent access attempt associated with the individual 132 at the location of the access attempt, e.g., the entrance 124 of the premises 122.

In this optional aspect, at block 406, the method 400 may further include confirming, by the access control system, the identity of the individual based on comparing the digital identity profile of the individual with further visual data of the individual captured contemporaneously with the subsequent access attempt. For example, in an aspect, computing device 100, processor 105, memory 110, automated digital identity profile management component 115, and/or confirming component 225 may be configured to or may comprise means for confirming, by the access control system 10, the identity of the individual 132 based on comparing the digital identity profile 120 of the individual 132 with further visual data of the individual 132 captured (e.g., by the camera 130) contemporaneously with the subsequent access attempt at the entrance 124 of the premises 122.

In this optional aspect, at block 408, the method 400 may further include granting access to the individual by the access control system in response to confirming the identity of the individual based on the digital identity profile. For example, in an aspect, computing device 100, processor 105, memory 110, automated digital identity profile management component 115, and/or granting component 230 may be configured to or may comprise means for granting access to the individual 132 by the access control system 10 in response to confirming the identity of the individual 132 based on the digital identity profile 120 of the individual 132.

In this optional aspect, at block 410, the method 400 may further include updating the digital identity profile of the individual based on the further visual data of the individual captured contemporaneously with the subsequent access attempt. For example, in an aspect, computing device 100, processor 105, memory 110, automated digital identity profile management component 115, and/or updating component 260 may be configured to or may comprise means for updating the digital identity profile 120 of the individual 132 based on the further visual data of the individual 132 captured (e.g., by the camera 130) contemporaneously with the subsequent access attempt at the entrance 124 of the premises 122.

Figure 5:
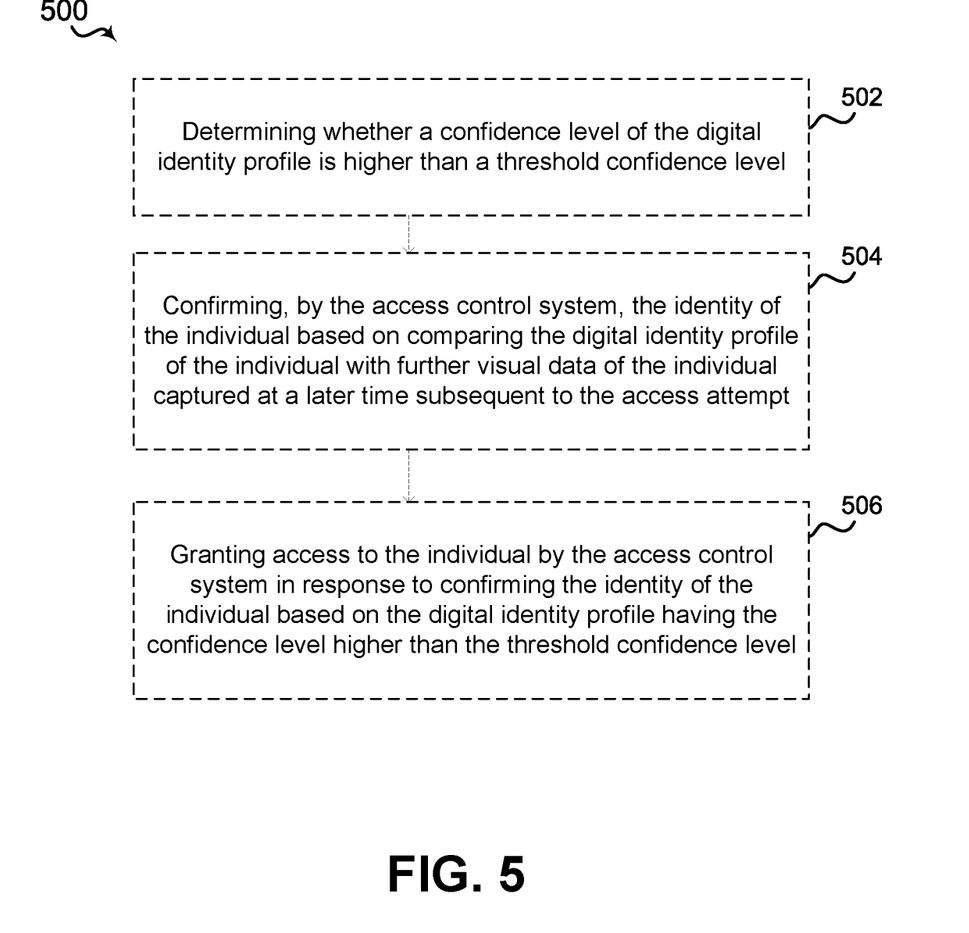
FIG. 5 is a flow diagram of a third example method for automatically creating digital identity profiles, according to some aspects.

Referring to FIG. 5, in an optional aspect, at block 502, the method 500 may further include determining whether a confidence level of the digital identity profile is higher than a threshold confidence level. For example, in an aspect, computing device 100, processor 105, memory 110, automated digital identity profile management component 115, and/or determining component 265 may be configured to or may comprise means for determining whether a confidence level of the digital identity profile 120 is higher than a threshold confidence level (e.g., 95%).

In this optional aspect, at block 504, the method 500 may further include confirming, by the access control system, the identity of the individual based on comparing the digital identity profile of the individual with further visual data of the individual captured at a later time subsequent to the access attempt. For example, in an aspect, computing device 100, processor 105, memory 110, automated digital identity profile management component 115, and/or confirming component 225 may be configured to or may comprise means for confirming, by the access control system 10, the identity of the individual 132 based on comparing the digital identity profile 120 of the individual 132 with further visual data of the individual 132 captured (e.g., by the camera 130) at the entrance 124 of the premises 122 at a later time subsequent to the access attempt.

In this optional aspect, at block 506, the method 500 may further include granting access to the individual by the access control system in response to confirming the identity of the individual based on the digital identity profile having the confidence level higher than the threshold confidence level. For example, in an aspect, computing device 100, processor 105, memory 110, automated digital identity profile management component 115, and/or granting component 230 may be configured to or may comprise means for granting access to the individual 132 by the access control system 10 in response to confirming the identity of the individual 132 based on the digital identity profile 120 having the confidence level higher than the threshold confidence level.

Figure 6:
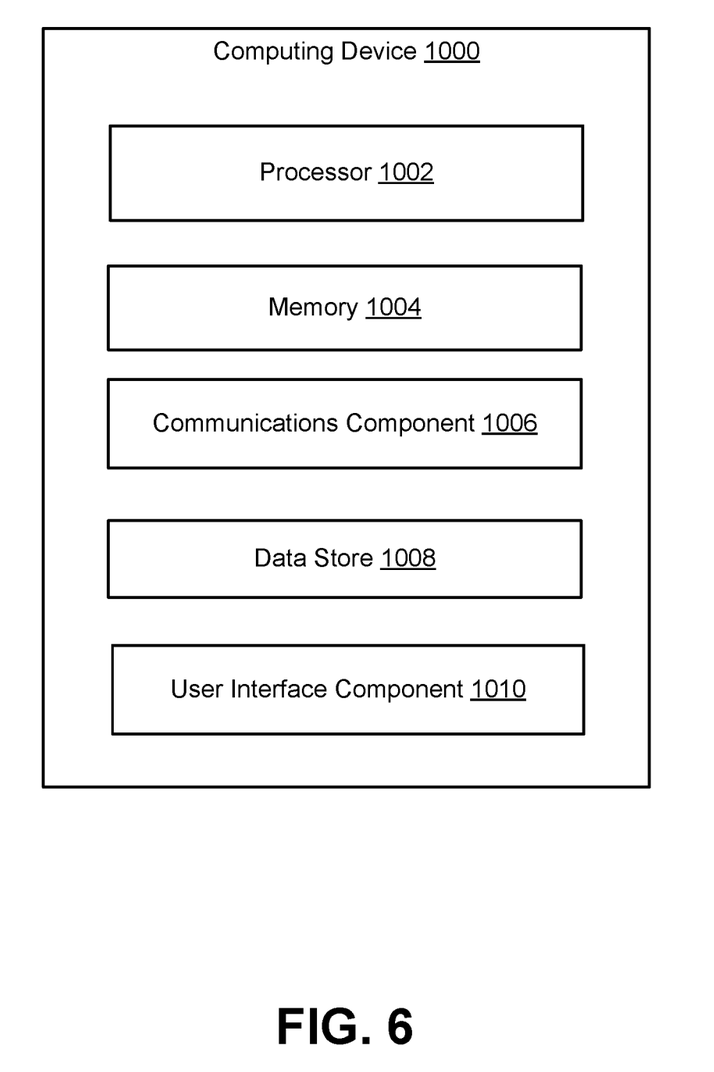
FIG. 6 is a block diagram of an example computing device which may implement all or a portion of any component in FIG. 1, according to some aspects.

Referring to FIG. 6, an example block diagram provides details of computing components in a computing device 1000 that may implement all or a portion of computing device 100, camera 130, mobile device 136, key fob 134, access panel 128, lock 126, or any other component described above with reference to FIGS. 1-5. The computing device 1000 includes a processor 1002 which may be configured to execute or implement software, hardware, and/or firmware modules that perform any access control—related or other functionality described above with reference to computing device 100, camera 130, mobile device 136, key fob 134, access panel 128, lock 126, or any other component described above with reference to FIGS. 1-5.

The processor 1002 may be a micro-controller and/or may include a single or multiple set of processors or multi-core processors. Moreover, the processor 1002 may be implemented as an integrated processing system and/or a distributed processing system. The computing device 1000 may further include a memory 1004, such as for storing local versions of applications being executed by the processor 1002, related instructions, parameters, etc. The memory 1004 may include a type of memory usable by a computer, such as random access memory (RAM), read only memory (ROM), tapes, magnetic discs, optical discs, volatile memory, non-volatile memory, and any combination thereof. Additionally, the processor 1002 and the memory 1004 may include and execute an operating system executing on the processor 1002, one or more applications, display drivers, etc., and/or other components of the computing device 1000.

Further, the computing device 1000 may include a communications component 1006 that provides for establishing and maintaining communications with one or more other devices, parties, entities, etc., utilizing hardware, software, and services. The communications component 1006 may carry communications between components on the computing device 1000, as well as between the computing device 1000 and external devices, such as devices located across a communications network and/or devices serially or locally connected to the computing device 1000. For example, the communications component 1006 may include one or more buses, and may further include transmit chain components and receive chain components associated with a wireless or wired transmitter and receiver, respectively, operable for interfacing with external devices.

Additionally, the computing device 1000 may include a data store 1008, which can be any suitable combination of hardware and/or software, that provides for mass storage of information, databases, and programs. For example, the data store 1008 may be or may include a data repository for applications and/or related parameters not currently being executed by processor 1002. In addition, the data store 1008 may be a data repository for an operating system, application, display driver, etc., executing on the processor 1002, and/or one or more other components of the computing device 1000.

The computing device 1000 may also include a user interface component 1010 operable to receive inputs from a user of the computing device 1000 and further operable to generate outputs for presentation to the user (e.g., via a display interface to a display device). The user interface component 1010 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 1010 may include one or more output devices, including but not limited to a display interface, a speaker, a haptic feedback mechanism, a printer, any other mechanism capable of presenting an output to a user, or any combination thereof.

Some further aspects include the below.

1. A method of access control, comprising:
   identifying, by an access control system, an access attempt associated with an individual;
   confirming, by the access control system, an identity of the individual;
   granting access to the individual by the access control system in response to confirming the identity of the individual; and
   building, by the access control system, a digital identity profile of the individual based on visual data of the individual captured contemporaneously with the access attempt.

2. The method of clause 1, wherein the digital identity profile of the individual comprises visual characteristics of the individual.

3. The method of any of the above clauses, wherein the digital identity profile of the individual further comprises at least one of location information or time information of the access attempt.

4. The method of any of the above clauses, wherein building the digital identity profile of the individual comprises using a machine learning model to extract the visual characteristics of the individual from the visual data.

5. The method of any of the above clauses, further comprising:
   monitoring a location of the access attempt;
   identifying, by the access control system, a subsequent access attempt associated with the individual at the location of the access attempt;
   confirming, by the access control system, the identity of the individual based on comparing the digital identity profile of the individual with further visual data of the individual captured contemporaneously with the subsequent access attempt; and
   granting access to the individual by the access control system in response to confirming the identity of the individual based on the digital identity profile.

6. The method of any of the above clauses, wherein monitoring the location of the access attempt comprises visually monitoring the location of the access attempt.

7. The method of any of the above clauses, wherein monitoring the location of the access attempt comprises tracking motion at the location of the access attempt.

8. The method of any of the above clauses, further comprising:
   updating the digital identity profile of the individual based on the further visual data of the individual captured contemporaneously with the subsequent access attempt.

9. The method of any of the above clauses, further comprising:
   determining whether a confidence level of the digital identity profile is higher than a threshold confidence level;
   confirming, by the access control system, the identity of the individual based on comparing the digital identity profile of the individual with further visual data of the individual captured at a later time subsequent to the access attempt; and
   granting access to the individual by the access control system in response to confirming the identity of the individual based on the digital identity profile having the confidence level higher than the threshold confidence level.

10. The method of any of the above clauses, further comprising:
    searching for recorded footage of the individual based on the digital identity profile of the individual.

11. An apparatus for access control, comprising:
    a memory; and
    a processor communicatively coupled with the memory and configured to perform the method of any of the above clauses.

21. A non-transitory computer-readable medium storing instructions for access control that are executable to perform the method of any of the above clauses.

22. An apparatus for access control, comprising means for performing the method of any of the above clauses.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for".

What is claimed is:

1. A method of premises access control, comprising:
    identifying, by a premises access control system, a premises access attempt associated with an individual attempting to access an entrance to a premises;
    confirming, by the premises access control system, an identity of the individual;
    granting access to the entrance of the premises to the individual by the premises access control system in response to confirming the identity of the individual;
    capturing visual data of the individual at a location of the entrance of the premises, pursuant to confirming the identity of the individual; and
    building, by the premises access control system, a digital identity profile of the individual based on the visual data of the individual captured at the location of the entrance of the premises.

2. The method of claim 1, wherein the digital identity profile of the individual comprises visual characteristics of the individual.

3. The method of claim 2, wherein the digital identity profile of the individual further comprises at least one of location information or time information of the premises access attempt.

4. The method of claim 2, wherein building the digital identity profile of the individual comprises using a machine learning model to extract the visual characteristics of the individual from the visual data.

5. The method of claim 1, further comprising:
    identifying, by the premises access control system, a subsequent premises access attempt associated with the individual at the location of the premises access attempt;
    confirming, by the premises access control system, the identity of the individual based on comparing the digital identity profile of the individual with further visual data of the individual captured contemporaneously with the subsequent premises access attempt; and
    granting access to the entrance of the premises to the individual by the premises access control system in response to confirming the identity of the individual based on the digital identity profile.

6. The method of claim 5, further comprising tracking motion at the location of the premises access attempt.

7. The method of claim 5, further comprising:
    updating the digital identity profile of the individual based on the further visual data of the individual captured contemporaneously with the subsequent premises access attempt.

8. The method of claim 1, further comprising:
    determining whether a confidence level of the digital identity profile is higher than a threshold confidence level;
    confirming, by the premises access control system, the identity of the individual based on comparing the digital identity profile of the individual with further visual data of the individual captured at a later time subsequent to the premises access attempt; and
    wherein granting access to the entrance of the premises to the individual by the premises access control system is in response to confirming the identity of the individual based on the digital identity profile having the confidence level higher than the threshold confidence level.

9. The method of claim 1, further comprising searching for recorded footage of the individual based on the digital identity profile of the individual.

10. The method of claim 1, wherein capturing the visual data comprises capturing the visual data by an image or video capture device pointing at the location of the entrance to the premises.

11. An apparatus for premises access control, comprising:
    a memory; and
    a processor communicatively coupled with the memory and configured to:
        identify, by a premises access control system, a premises access attempt associated with an individual attempting to access an entrance to a premises;
        confirm, by the premises access control system, an identity of the individual;
        grant access to the entrance of the premises to the individual by the premises access control system in response to confirming the identity of the individual;
        capture visual data of the individual at a location of the entrance of the premises, pursuant to confirming the identity of the individual; and
        build, by the premises access control system, a digital identity profile of the individual based on the visual data of the individual captured at the location of the entrance of the premises.

12. The apparatus of claim 11, wherein the digital identity profile of the individual comprises visual characteristics of the individual.

13. The apparatus of claim 12, wherein the digital identity profile of the individual further comprises at least one of location information or time information of the premises access attempt.

14. The apparatus of claim 12, wherein to build the digital identity profile of the individual comprises using a machine learning model to extract the visual characteristics of the individual from the visual data.

15. The apparatus of claim 11, wherein the processor is further configured to:
   identify, by the premises access control system, a subsequent premises access attempt associated with the individual at the location of the premises access attempt;
   confirm, by the premises access control system, the identity of the individual based on comparing the digital identity profile of the individual with further visual data of the individual captured contemporaneously with the subsequent premises access attempt; and
   wherein granting access to the entrance of the premises to the individual by the premises access control system is in response to confirming the identity of the individual based on the digital identity profile.

16. The apparatus of claim 15, wherein the processor is further configured to track motion at the location of the premises access attempt.

17. The apparatus of claim 15, wherein the processor is further configured to update the digital identity profile of the individual based on the further visual data of the individual captured contemporaneously with the subsequent premises access attempt.

18. The apparatus of claim 11, wherein the processor is further configured to:
   determine whether a confidence level of the digital identity profile is higher than a threshold confidence level;
   confirm, by the premises access control system, the identity of the individual based on comparing the digital identity profile of the individual with further visual data of the individual captured at a later time subsequent to the premises access attempt; and
   wherein granting access to the entrance of the premises to the individual by the premises access control system is in response to confirming the identity of the individual based on the digital identity profile having the confidence level higher than the threshold confidence level.

19. The apparatus of claim 11, wherein the processor is further configured to search for recorded footage of the individual based on the digital identity profile of the individual.

20. A non-transitory computer-readable medium storing instructions for premises access control that are executable to:
   identify, by a premises access control system, a premises access attempt associated with an individual attempting to access an entrance to a premises;
   confirm, by the premises access control system, an identity of the individual;
   grant access to the entrance of the premises to the individual by the premises access control system in response to confirming the identity of the individual;
   capture visual data of the individual at a location of the entrance of the premises, pursuant to confirming the identity of the individual; and
   build, by the premises access control system, a digital identity profile of the individual based on the visual data of the individual captured at the location of the entrance of the premises.

* * * * *